United States Patent [19]

Minieri

[11] 3,821,180
[45] June 28, 1974

[54] SURFACE-COATING COMPOSITIONS CONTAINING N-(SUBSTITUTED INDAZOLYL-N1-METHYL) ALKYLENEIMINES

[75] Inventor: Pasquale P. Minieri, Woodside, N.Y.

[73] Assignee: Tenneco Chemicals, Inc., Saddle Brook, N.J.

[22] Filed: June 5, 1973

[21] Appl. No.: 367,265

Related U.S. Application Data

[63] Continuation-in-part of Ser. No. 201,159, Nov. 22, 1971, Pat. No. 3,766,192, which is a continuation-in-part of Ser. Nos. 689,812, Dec. 12, 1967, Pat. No. 3,641,050, and Ser. No. 141,999, May 10, 1971, Pat. No. 3,741,979.

[52] U.S. Cl. ............ 260/89.1, 106/15 AF, 106/17, 260/29.6 MN, 260/78.5 T, 260/85.1, 260/85.5 N, 260/86.1 R, 260/86.3, 260/86.7, 260/87.1, 260/88.7 F, 260/92.8 A, 260/94.8, 260/94.9 R, 260/293.6
[51] Int. Cl. ............................ C09d 3/26, C09d 5/14
[58] Field of Search .......... 106/15 AF, 17; 260/89.1

[56] References Cited
UNITED STATES PATENTS 3,017,415  1/1962  Sarett et al. .................... 106/15 AF
3,350,211  10/1967  Greenwald ...................... 106/15 AF
3,555,040  1/1971  Frick et al. ...................... 106/15 AF
3,637,736  1/1972  Minieri ........................... 106/15 AF
3,646,210  2/1972  Johannes et al. ............... 106/15 AF
3,766,207  10/1973  Minieri ........................... 106/15 AF

*Primary Examiner*—Harry Wong, Jr.
*Attorney, Agent, or Firm*—Evelyn Berlow

[57] ABSTRACT

Compounds that have the structural formula

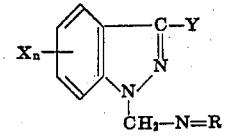

wherein X represents halogen, nitro, amino, acetamino, aroylamino, or (halobenzylidiene)amino; Y represents hydrogen or halogen; R represents an alkylene group having from four to eight carbon atoms; and n represents an integer in the range of zero to 2 are used to protect surface-coating compositions from deterioration resulting from attach by fungi and bacteria. Illustrative of these compounds are N-(5-nitroindazolyl-$N^1$-methyl)hexamethyleneimine and N-(3-chloroindazolyl-$N^1$-methyl)piperidine.

10 Claims, No Drawings

SURFACE-COATING COMPOSITIONS CONTAINING N-(SUBSTITUTED INDAZOLYL-N1-METHYL) ALKYLENEIMINES

This is a continuation-in-part of my copending application Ser. No. 201,159, which was filed on Nov. 22, 1971 and which is now U.S. Pat. No. 3,766,192, and which is a continuation-in-part of copending applications Ser. No. 689,812, which was filed on Dec. 12, 1967 and which is now U.S. Pat. No. 3,641,050, and Ser. No. 141,999, which was filed on May 10, 1971 and which is now U.S. Pat. No. 3,741,979.

This invention relates to surface-coating compositions that have improved resistance to deterioration resulting from attack by fungi, bacteria, and other microorganisms. More particularly, it relates to surface-coating compositions that contain biocidal amounts of N-(substituted indazolyl-$N^1$-methyl)alkyleneimines.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions suceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others have an adverse effect on the color, odor, or viscosity of the composition or undergo sulfide staining, and still others hydrolyze in alkaline aqueous paint systems or separate from the applied coating by migration, volatilization, or leaching once the coating has been spread in a thin layer over the surface to be protected.

In accordance with this invention, it has been found that N-(substituted indazolyl-$N^1$-methyl)alkyleneimines are of particular value as bicoides in surface-coating compositions. These compounds, which are thoroughly compatible with the resinous binders that commonly are used in surface-coating compositions and which are resistant to sulfide staining, provide excellent and prolonged resistance to deterioration resulting from attack by fungi and bacteria without adversely affecting the color, pH, viscosity, odor, and other physical properties of the surface-coating compositions.

The biocidal compounds that are used in the surface-coating compositions of this invention may be represented by the structural formula

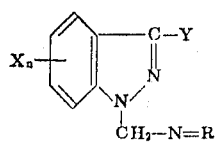

wherein X represents chlorine, bromine, fluorine, iodine, nitro, amino, acetamino, aroylamino, or (halobenzylidene)amino; Y represents hydrogen, chlorine, bromine, fluorine, or iodine; R represents an alkylene group having from four to eight carbon atoms; and n represents an integer in the range of zero to 2.

The most effective of these compounds as biocides in surface-coating compositions are those represented by the structural formula

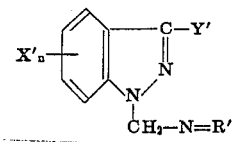

wherein X' represents nitro, chlorine, or (chlorobenzylidene)amino; Y' represents hydrogen or chlorine; R' represents a branched or unbranched alkylene group having five or six carbon atoms; n represents an integer in the range of zero to 2; and then n represents zero, Y' represents chlorine. Illustrative of these preferred biocidal compounds are the following: N-(3-chloroindazolyl-$N^1$-methyl)piperidine, N-(3-chloro-5-nitroindazolyl-$N^1$-methyl)piperidine, N-(5,6-dinitroindazolyl-$N^1$-methyl)piperidine, N-(6-nitroindazolyl-$N^1$-methyl)piperidine, N-(5-chloroindazolyl-$N^1$-methyl)-3-methylpiperidine, N-(3-chloroindazolyl-$N^1$-methyl)hexamethyleneimine, N-(5-chloroindazolyl-$N^1$-methyl)hexamethyleneimine, N-(6-chloroindazolyl-$N^1$-methyl)hexamethyleneimine, N-(3,5-dichloroindazolyl-$N^1$-methyl)hexamethyleneimine, N-(3,6-dichloroindazolyl-$N^1$-methyl)hexamethyl-eneimine, N-(3,5,6-trichloroindazolyl-$N^1$-methyl)hexamethyleneimine, N-(3-chloro-5-nitroindazolyl-$N^1$-methyl)hexamethyleneimine, N-(3-chloro-6-nitroindazolyl-$N^1$-methyl)hexamethyleneimine, N-(3,5-dichloroindazolyl-$N^1$-methyl)hexamethyleneimine, N-(5,6-dinitroindazolyl-$N^1$-methyl)hexamethyleneimine, and the like.

The novel compounds may be prepared by any suitable and convenient procedure. For example, they may be prepared by heating the appropriate $N^1$-hydroxymethyl-substituted-indazole with an alkyleneimine. The reaction is preferably carried out in a solvent, such as benzene, toluene, pyridine, or acetone, at the reflux temperature of the reaction mixture. The $N^1$-hydroxymethylsubstituted-indazoles may be prepared by the procedure described in U.S. Pat. No. 3,637,736.

In a preferred embodiment of this invention, the N-(substituted indazolyl-$N^1$-methyl)alkyleneimines are used to impart fungal and bacterial resistance to dried films of protective or decorative coating compositions that have been applied to a surface. When they are added in the amount of about 0.1 percent to 5 percent, and preferably 0.25 percent to 2 percent, based on the weight of the surface-coating composition, these compounds provide excellent and prolonged resistance to deterioration resulting from attack by fungi, bacteria, and other microorganisms without adversely affecting the physical properties of the surface-coating compositions or of the dried films of these compositions.

The N-(substituted indazolyl-$N^1$-methyl)alkyleneimines can be used to impart fungal and bacterial resistance to a wide variety of surface-coating compositions including both organic solvent-based and water-based coating systems. The surface-coating compositions generally contain about 10 percent to 60 percent by weight of an organic, water-insoluble, film-forming, resinous binder that is a synthetic linear addition polymer and/or an oleoresinous binder.

Illustrative of the synthetic linear addition polymers that can be used as the binder in the compositions of this invention are the following: polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof. Suitable oleo-resinous binders include drying oils, bodied drying oils, oleo-resinous varnishes, alkyd resins, and mixtures thereof.

In addition to the resinous binder and the biocidal compound, the surface-coating compositions may contain various auxiliary materials, such as pigments, extenders, solvents, dyes, defoaming agents, driers, emulsifiers, plasticizers, and the like in the amounts ordinarily used for these purposes.

The biocidal compounds may be incorporated into the surface-coating compositions by any convenient procedure. For example, they can be combined with the pigments and other ingredients to form a pigment phase that is mixed with the resinous binder and water or organic solvent to form the surface-coating composition. Alternatively, they can be added to a composition that contains the resinous binder, pigment, and water or organic solvent. The biocidal compounds can be added as such to the other ingredients, or they can be added as a solution in, for example, an alcohol, ether, hydrocarbon, or ketone.

The invention is further illustrated by the following examples:

EXAMPLE 1

To 200 ml. of toluene, which had been dried by azeotropic distillation, was added with stirring 18.3 grams (0.1 mole) of $N^1$-hydroxymethyl-3-chloroindazole and 10 grams (0.1 mole) of hexamethyleneimine. The reaction mixture was heated at its reflux temperature until 1.8 ml. of water had been evolved and then for an additional 30 minutes at this temperature. The reaction mixture was then heated on a water bath under reduced pressure until it reached constant weight. There was obtained 27.7 grams of N-(3-chloroindazolyl-$N^1$-methyl)hexamethyleneimine, which contained 63.35 percent C, 6.51 percent H, and 15.62 percent N (calculated, 65.2 percent C, 6.52 percent H, and 15.2 percent N).

EXAMPLE 2

A mixture of 125 ml. of dry toluene, 18.3 grams (0.1 mole) of $N^1$-hydroxymethyl-5-chloroindazole, and 10 grams (0.1 mole) of hexamethyleneimine was heated at its reflux temperature until the theoretical quantity (1.8 ml.) of water had been evolved and then for an additional 30 minutes at this temperature. The reaction mixture was heated on a water bath under reduced pressure until it reached constant weight. There was obtained a 100 percent yield of N-(5-chloroindazolyl-$N^1$-methyl)hexamethyleneimine, a liquid which solidified on standing. The product contained 64.1 percent C, 6.75 percent H, 16.5 percent N, and 13.5 percent Cl (calculated, 65.2 percent C, 6.52 percent H, 15.2 percent N, and 12.8 percent Cl).

EXAMPLE 3

A mixture of 125 ml. of dry toluene, 18.3 grams (0.1 mole) of N-$^1$-hydroxymethyl-3,5-dichloroindazole, and 10 grams (0.1 mole) of hexamethyleneimine was heated at its reflux temperature until 1.8 ml. of water had been evolved and then for an additional 30 minutes at this temperature. The reaction mixture was treated with decolorizing carbon and filter aid and then heated on a water bath under reduced pressure until it reached constant weight. There was obtained a 97.3 percent yield of N-(3,5-dichloroindazolyl-$N^1$-methyl)hexamethyleneimine, which melted at 34°–35°C.

EXAMPLES 4 – 9

A series of N-(substituted indazolyl-$N^1$-methyl)hexamethyleneimines was prepared by the procedures described in Examples 2 and 3. The compounds prepared and their properties are given in Table I.

TABLE I

| Ex. No. | Compound | Method of Preparation | Yield (%) | Melting Point (°C.) |
|---|---|---|---|---|
| 4 | N-[6-(3,4-dichlorobenzylidene) aminoindazolyl-$N^1$-methyl] hexamethyleneimine | Ex. 2 | 100.0 | Oil |
| 5 | N-(3-chloro-5-nitroindazolyl-$N^1$-methyl)hexamethyleneimine | Ex. 2 | 98.7 | Semi-solid |
| 6 | N-(3-chloro-6-nitroindazolyl-$N^1$-methyl)hexamethyleneimine | Ex. 3 | 95.3 | 74–81 |
| 7 | N-(5-nitroindazolyl-$N^1$-methyl)-hexamethyleneimine | Ex. 3 | 93.5 | 72–82 |
| 8 | N-(6-nitroindazolyl-$N^1$-methyl)-hexamethyleneimine | Ex. 3 | 91.7 | 73–83 |
| 9 | N-(5,6-dinitroindazolyl-$N^1$-methyl)hexamethyleneimine | Ex. 3 | 96.6 | 87–96 |

EXAMPLE 10

A mixture of 200 ml. of benzene, 18.3 grams (0.1 mole) of $N^1$-hydroxymethyl-5,6-dinitroindazole, and 9.2 grams (0.11 mole) of piperidine was heated at its reflux temperature until the theoretical quantity (1.8 ml.) of water had been evolved and then for an additional 75 minutes at this temperature. The reaction mixture was heated on a water bath under reduced pressure until it reached constant weight. There was obtained 29 grams (95.3 percent yield) of N-(5,6-dinitroindazolyl-$N^1$-methyl)piperidine, which melted at 130°–133°C. and contained 50.48 percent C, 4.90 percent H, and 22.7 percent N (calculated, 51.1 percent C, 4.92 percent H, and 22.95 percent N). The structure of the compound was confirmed by infra-red analysis.

EXAMPLE 11

A mixture of 19 grams (0.0985 mole) of $N^1$-hydroxymethyl-6-nitroindazole and 21.3 grams (0.25 mole) of piperidine was heated on a boiling water bath for 30 minutes and then cooled to room temperature. When 100 ml. of water had been added to the reaction mixture, it separated into aqueous and oil phases. The oil phase was separated, and it solidified on standing. It was filtered, washed with water, and vacuum dried at 60°C. The resulting crude product was recrystallized from ligroin. There was obtained 24 grams (93.8 percent yield) of N-(6-nitroindazolyl-$N^1$-methyl)piperidine, which melted at 94°–96°C. and contained 59.98 percent C, 6.19 percent H, and 22.05 percent N (calculated, 59.9 percent C, 6.15 percent H, and 22.15 percent N). The structure of the compound was confirmed by infra-red analysis.

EXAMPLES 12–18

A series of N-(substitued indazolyl-$N^1$-methyl)piperidines was prepared by the procedures described in Examples 10 and 11. In each case the structure of the compound was confirmed by infra-red analysis. The compounds prepared and their properties are given in Table II.

|  | Parts by Weight |
|---|---|
| Water | 168 |
| Alkyl aryl ether surfactant (Triton CF–10) | 6 |
| 25% Aqueous solution of sodium salt of maleic anhydride/diisobutylene copolymer | 27 |
| Defoamer | 12 |
| 2% Aqueous solution of hydroxyethyl cellulose | 300 |
| Ethylene glycol | 60 |
| Titanium dioxide | 750 |
| Mica (waterground) | 90 |
| Calcium carbonate | 375 |
| Ammonium hydroxide (28% aqueous solution) | 6 |
| Aqueous dispersion containing 46% acrylic ester polymer (66% ethyl acrylate, 32.5% methyl acrylate, and 1.5% acrylic acid) | 1642 |

This paint had the following properties:

Table II

| Ex. No. | Compound | Method of Preparation | Yield (%) | Melting Point (°C.) | % C | % H | % N | % Cl |
|---|---|---|---|---|---|---|---|---|
| 12 | N-(3-chloroindazolyl-$N^1$-methyl)piperidine | Ex. 10 | 100.0 | — | — | — | — | — |
| 13 | N-(3-chloro-5-nitroindazolyl-$N^1$-methyl)piperidine | Ex. 11 | 96.7 | 106–114 | 54.99 (52.8) | 5.25 (5.08) | 20.09 (18.95) | — |
| 14 | N-(5-nitroindazolyl-$N^1$-methyl)piperidine | Ex. 11 | 91.0 | 89–91 | 60.6 (60.0) | 6.18 (6.15) | 22.4 (21.6) | — |
| 15 | N-(5-chloroindazolyl-$N^1$-methyl)piperidine | Ex. 11 | 97.8 | 104–105 | — | — | 16.1 (16.8) | 13.6 (14.2) |
| 16 | N-(3,5-dichloroindazolyl-$N^1$-methyl)piperidine | Ex. 11 | 96.0 | 75–78 | 53.96 (54.8) | 4.58 (5.28) | 14.7 (14.8) | 25.7 (25.0) |
| 17 | N-(5-chloroindazolyl-$N^1$-methyl)-3-methylpiperidine | Ex. 11 | 92.2 | 59–65 | 62.9 (63.7) | 6.50 (6.83) | 15.53 (15.9) | 14.39 (13.45) |
| 18 | N-(5,6-dinitroindazolyl-$N^1$-methyl)-3-methylpiperidine | Ex. 10 | 99.0 | 108–115 | 53.27 (51.1) | 5.27 (5.17) | 21.3 (21.3) | — |

EXAMPLE 19

A. A polyvinyl acetate latex paint was prepared by mixing together the following materials:

|  | Parts by Weight |
|---|---|
| Water | 481.5 |
| 25% Aqueous solution of sodium salt of maleic anhydride/diisobutylene copolymer (Tamol 731) | 24 |
| Potassium pyrophosphate | 3 |
| Long chain fatty acids alkanolamide | 9 |
| Defoamer | 6 |
| Ethylene glycol | 75 |
| 1.25% Aqueous solution of hydroxyethyl cellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint has the following properties as determined by standard paint testing procedures:

| Viscosity | 65 K.U. |
|---|---|
| Brookfield Viscosity (No. 4 spindle, 60 rpm) | 800 cps. |
| pH | 7.8 |
| Yellowness Index | 3.0 |

B. An acrylic latex paint was prepared by mixing together the following materials:

| Viscosity | 72 K.U. |
|---|---|
| Brookfield Viscosity (No. 3 spindle, 60 rpm) | 1250 cps. |
| pH | 9.2 |
| Yellowness Index | 2.6 |

C. An exterior house paint was prepared by mixing together the following materials:

|  | Parts by Weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent | 2 |
| Manganese naphthenate (6%) | 2.27 |
| Lead naphthenate (24%) | 11.3 |

EXAMPLE 20

The paints whose preparation was described in Example 19 were evaluated by means of an agar diffusion assay. In this test, agar is inoculated with the test organism, the paint to which 2 percent by weight of a biocide has been added is placed in a well cut from the agar, and after incubation at 28°C. and 85-95 percent relative humidity, the activity of the biocide is measured by zones of inhibition. The biocidal compounds tested and the results obtained are given in Table III. In this table

```
ZO  =  Zone of inhibition in mm.
O   =  No zone of inhibition; no growth
Tr  =  Trace zone of inhibition
—   =  Not tested
Bacteria  A - Bacillus subtilis
          B - Aerobacter aerogenes
          C - Pseudononas aeruginosa
          D - Mixed inoculum consisting of P. aeruginosa
              ATCC 10145, A. aerogenes ATCC 7256, and
              three unidentified strains of Bacillus
Fungi     E - Pullularia pullulans
          F - Penicillium crustosum
          G - Aspergillus niger
```

Each of the other N-(substituted indazolyl-N¹-methyl)-alkyleneimines herein disclosed can be used in a similar manner to inhibit or prevent the growth of microorganisms in surface-coating compositions.

1 that contains 0.10 percent to 5 percent, based on the weight of the composition, of the biocidal compound.

3. A surface-coating composition as set forth in claim 1 wherein the organic, water-insoluble, film-forming, resinous binder is selected from the group consisting of oleoresinous binders, synthetic linear addition polymers, and mixtures thereof.

4. A surface-coating composition as set forth in claim 1 wherein the organic, water-insoluble, film-forming, resinous binder is polyvinyl acetate.

5. A surface-coating composition as set forth in claim 1 wherein the biocidal compound has the structural formula

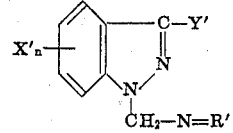

Table III

| Biocide | Paint | Effect on Paint | | Biocidal Activity | | | | | | |
| | | pH | Color | Bacteria | | | | Fungi | | |
| | | | | A | B | C | D | E | F | G |
|---|---|---|---|---|---|---|---|---|---|---|
| Product of Ex. 1 | PVA | 8.4 | Off-white | ZO-6 | ZO-5 | ZO-2 | — | Tr | ZO-6 | ZO-2 |
| | Acrylic | 9.3 | Off-white | ZO-3 | ZO-1 | ZO-2 | — | ZO-2 | ZO-3 | ZO-1 |
| | Oil | — | Off-white | — | — | — | — | ZO-4 | ZO-5 | ZO-2 |
| Product of Ex. 6 | PVA | 8.2 | Yellow | ZO-6 | ZO-2 | ZO-1 | ZO-5 | — | — | — |
| | Acrylic | 9.7 | Yellow | ZO-3 | Tr | — | ZO-4 | Tr | Tr | Tr |
| | Oil | — | Yellow | — | — | — | — | ZO-1 | ZO-1 | Tr |
| Product of Ex. 7 | PVA | 8.3 | Off-white | ZO-5 | ZO-1 | Tr | ZO-5 | — | — | — |
| | Acrylic | 9.6 | Beige | ZO-5 | ZO-1 | Tr | ZO-3 | Tr | Tr | Tr |
| | Oil | — | Beige | — | — | — | — | ZO-5 | ZO-3 | Tr |
| Product of Ex. 8 | PVA | 8.4 | Yellow | ZO-6 | ZO-3 | ZO-1 | ZO-3 | — | — | — |
| | Acrylic | 9.7 | Beige | ZO-3 | Tr | — | ZO-5 | Tr | Tr | Tr |
| | Oil | — | Beige | — | — | — | — | ZO-1 | ZO-2 | Tr |
| Product of Ex. 9 | PVA | 8.3 | Yellow | ZO-2 | ZO-1 | ZO-2 | ZO-7 | — | — | — |
| | Acrylic | 9.7 | Yellow | ZO-5 | ZO-1 | — | ZO-3 | Tr | Tr | Tr |
| | Oil | — | Yellow | — | — | — | — | Tr | Tr | Tr |
| Product of Ex. 12 | PVA | 8.5 | White | ZO-3 | ZO-3 | ZO-1 | ZO-4 | Tr | ZO-2 | Tr |
| | Acrylic | 9.7 | White | Tr | ZO-4 | ZO-4 | ZO-1 | ZO-1 | ZO-6 | ZO-1 |
| | Oil | — | White | — | — | — | — | Tr | Tr | Tr |
| Bis(phenylmercury)dodecenyl-succinate (Super Ad-it) | PVA | 6.9 | Off-white | ZO-10 | ZO-2 | ZO-7 | — | ZO-17 | ZO-6 | ZO-13 |
| | Acrylic | 8.4 | Off-white | ZO-9 | — | ZO-6 | — | ZO-9 | ZO-1 | ZO-10 |
| | Oil | — | Off-White | — | — | — | — | ZO-8 | ZO-10 | ZO-10 |
| 2,3,5,6-Tetrachloro-4-(methylsulfonyl)pyridine (Dow 1013) | PVA | 7.3 | Off-White | ZO-8 | 0 | 0 | — | ZO-13 | ZO-10 | ZO-6 |
| | Acrylic | 9.2 | Off-white | ZO-8 | 0 | 0 | — | ZO-13 | ZO-7 | ZO-6 |
| | Oil | — | Beige | — | — | — | — | ZO-12 | ZO-10 | ZO-9 |

What is claimed is:

1. A surface-coating composition that comprises (a) an organic, water-insoluble, film-forming, resinous binder and (b) a biocidally effective amount of a biocidal compound having the structural formula

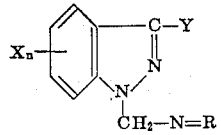

wherein X represents halogen, nitro, amino, acetamino, aroylamino, or (halobenzylidene)amino; Y represents hydrogen or halogen; R represents an alkylene group having from four to eight carbon atoms; and n represents an integer in the range of zero to 2.

2. A surface-coating composition as set forth in claim wherein X' represents nitro, chlorine, or (chlorobenzylidene)amino; Y' represents hydrogen or chlorine; R' represents an alkylene group having from five to six carbon atoms; n represents an integer in the range of zero to 2; and when n represents zero, Y' represents chlorine.

6. A surface-coating composition as set forth in claim 1 wherein the biocidal compound is N-(3-chloroindazolyl-N¹-methyl)piperidine.

7. A surface-coating composition as set forth in claim 1 wherein the biocidal compound is N-(3-chloro-6-nitroindazolyl-N¹-methyl)hexamethyleneimine.

8. A surface-coating composition as set forth in claim 1 wherein the biocidal compound is N-(3,5-dichloroindazolyl-N¹-methyl)hexamethyleneimine.

9. A surface-coating composition as set forth in claim 1 wherein the biocidal compound is N-(3-chloroindazolyl-$N^1$-methyl)hexamethyleneimine.

10. A surface-coating composition as set forth in claim 1 wherein the biocidal compound is N-(5,6-dinitroindazolyl-$N^1$-methyl)hexamethyleneimine.

* * * * *